US008862405B2

(12) United States Patent
Seydoux et al.

(10) Patent No.: US 8,862,405 B2
(45) Date of Patent: Oct. 14, 2014

(54) SYSTEM AND METHOD FOR PRODUCING LOOK-AHEAD PROFILE MEASUREMENTS IN A DRILLING OPERATION

(75) Inventors: Jean Seydoux, Rio de Janeiro (BR); Andrei I. Davydychev, Sugar Land, TX (US); Denis Heliot, Sugar Land, TX (US); Bennett N. Nicholas, Hamden, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 414 days.

(21) Appl. No.: 13/312,205

(22) Filed: Dec. 6, 2011

(65) Prior Publication Data

US 2013/0144529 A1 Jun. 6, 2013

(51) Int. Cl.
*G06F 19/00* (2011.01)
*G01V 3/20* (2006.01)
*G01V 3/18* (2006.01)
*G01V 3/38* (2006.01)

(52) U.S. Cl.
CPC .. *G01V 3/20* (2013.01); *G01V 3/18* (2013.01); *G01V 3/38* (2013.01)
USPC ........ 702/7; 702/9; 702/11; 175/45; 714/724; 714/733

(58) Field of Classification Search
CPC ............................ G01V 3/20; G01R 31/31853
USPC ................... 702/7, 9, 11; 324/333, 334, 338; 175/45; 714/724, 733
See application file for complete search history.

(56) References Cited

U.S. PATENT DOCUMENTS

| 3,744,310 | A | * | 7/1973 | Battistoni et al. ................ 73/156 |
| 4,766,577 | A | | 8/1988 | Clerke et al. |
| 6,031,225 | A | * | 2/2000 | Stern et al. ..................... 250/235 |
| 6,308,290 | B1 | * | 10/2001 | Forlenza et al. .............. 714/724 |
| 7,755,361 | B2 | * | 7/2010 | Seydoux et al. ............... 324/333 |
| 7,786,733 | B2 | * | 8/2010 | Seydoux et al. ............... 324/334 |
| 8,258,872 | B1 | * | 9/2012 | Lazar et al. .................... 330/285 |

(Continued)

FOREIGN PATENT DOCUMENTS

| WO | 2006022921 A1 | 3/2006 |
| WO | 2011080640 A2 | 7/2011 |

OTHER PUBLICATIONS

International Search Report and Written Opinion for International Application No. PCT/US2012/067696 dated Feb. 27, 2013.

*Primary Examiner* — Carol S Tsai
(74) *Attorney, Agent, or Firm* — Kimberly Ballew

(57) ABSTRACT

A method and system for producing look-ahead profiles measurements includes positioning an energy transmitter, such as a transmitting antenna, proximate to a borehole assembly tool. One or more energy receivers, such as receiving antennas, are positioned along a length of the borehole assembly. Next, energy is transmitted to produce look-ahead scans relative to the borehole assembly tool. Look-ahead graph data with an x-axis being a function of a time relative to the position of the borehole assembly tool is generated. The look-ahead graph is produced and displayed on a display device. The look-ahead graph may track estimated formation values based on earth models. The estimated formation values are displayed below a tool position history line that is part of the look-ahead graph. The estimated formation values in the look-ahead graph may be based on inversions of resistivity data from the look-ahead scans.

20 Claims, 11 Drawing Sheets

(56) References Cited

U.S. PATENT DOCUMENTS

2008/0312839 A1 12/2008 Mathiszik et al.
2009/0198447 A1 8/2009 Legendre et al.
2010/0307741 A1 12/2010 Mosse et al.
2011/0013308 A1* 1/2011 Brand ............................ 360/59
2011/0133740 A1* 6/2011 Seydoux et al. .............. 324/338
2013/0038463 A1 2/2013 Heliot et al.

* cited by examiner

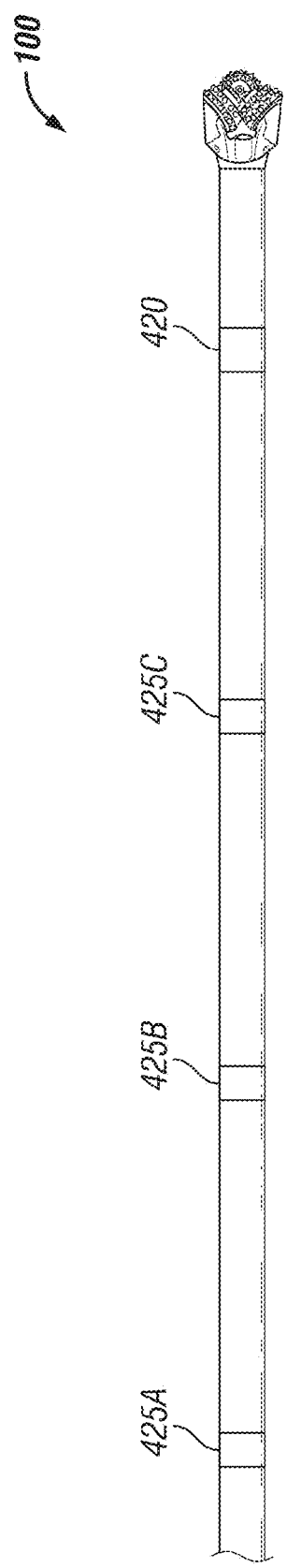

SYSTEM AND METHOD FOR PRODUCING LOOK-AHEAD PROFILE MEASUREMENTS IN A DRILLING OPERATION

BACKGROUND

Well placement was developed many years ago when measurements such as gamma rays and resistivity logs were made available in real-time. The major applications were constrained to the use or correlation of log features and comparison of log responses of user updated geological models with the real-time data received that tracks earth layers behind a drilling tool, like a drill bit. This real-time data that tracks earth layers behind a drilling operation is not the best way to estimate earth layers that are in front of a drill bit.

In other words, conventional drilling operations do not utilize so called look-ahead measurements or scans to predict formations that may be found in front of the bit and/or tool as understood by one of ordinary skill the art.

SUMMARY

A method and system for producing tool look-ahead profile measurements includes positioning an energy transmitter, such as a transmitting antenna, proximate to a borehole assembly tool. One or more energy receivers, such as receiving antennas, are positioned along a length of the borehole assembly. Next, energy is transmitted to produce look-ahead scans relative to the borehole assembly tool. Look-ahead model graph data with an x-axis being a function of a time relative to the position of the borehole assembly tool is generated.

The look-ahead model graph is produced and displayed on a display device. The look-ahead model graph may track estimated formation values based on earth models. The estimated formation values are displayed below a tool position history line that is part of the look-ahead model graph. The estimated formation values in the look-ahead model graph may be based on inversions of resistivity data from the look-ahead scans.

The inversions may comprise Monte-Carlo inversions. Meanwhile, measured resistivity values of the look-ahead model graph may be displayed above a tool history position line in the look-ahead model graph. An optional distribution graph comprising estimated formations generated by the look-ahead scans such that the distribution graph corresponds to a single tool position as tracked by the tool history position line of the look-ahead model graph may be displayed. One or more alerts based on the look-ahead model graph data may be generated when formations having a certain level of probability are detected.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

Figure 2A:
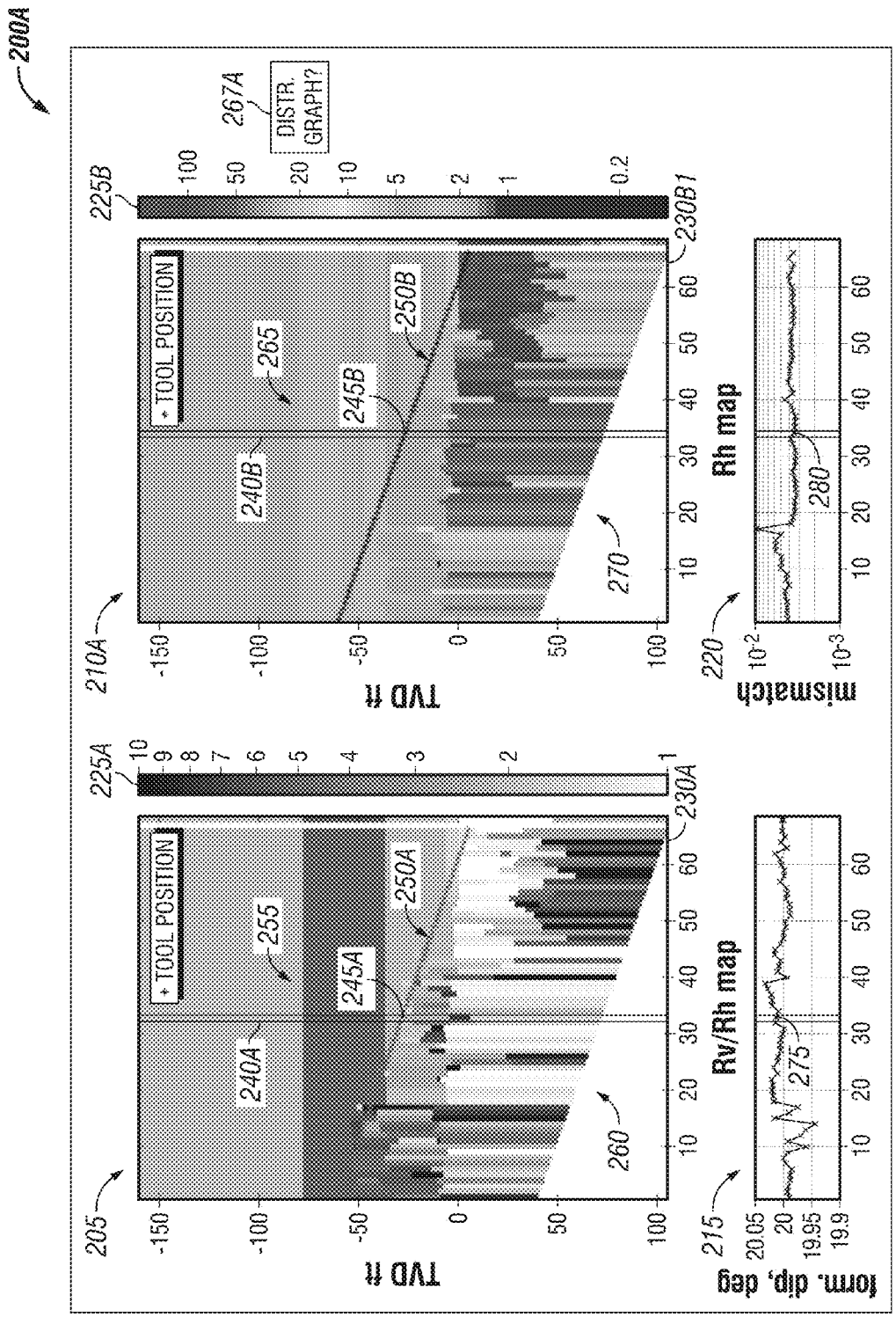
FIG. 2A is a diagram of a user interface comprising an anisotropy ratio graph and a look-ahead modeling graph.
Figure 2B:
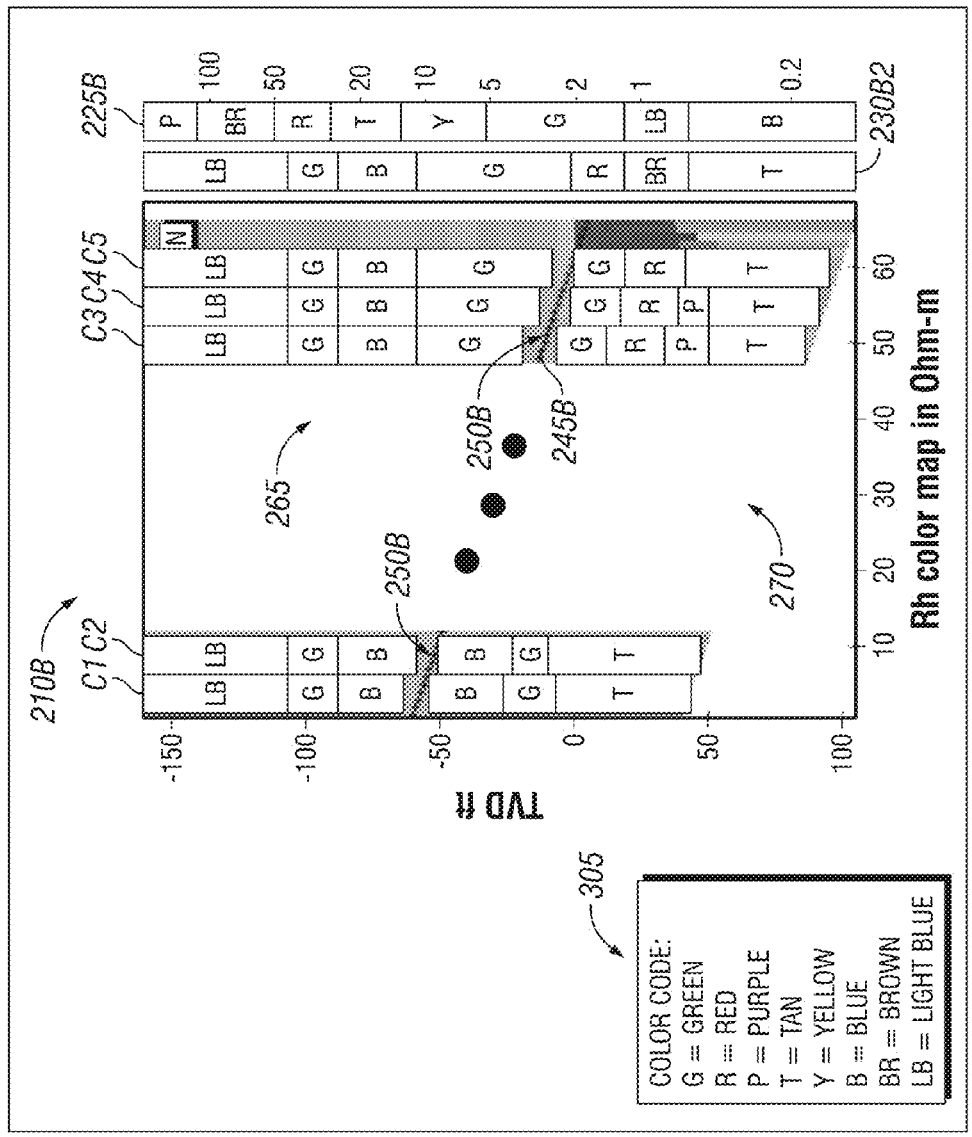
FIG. 2B is a diagram illustrating a visual coding scheme that may be employed in the look-ahead model graph of FIG. 2A.
Figure 2C:
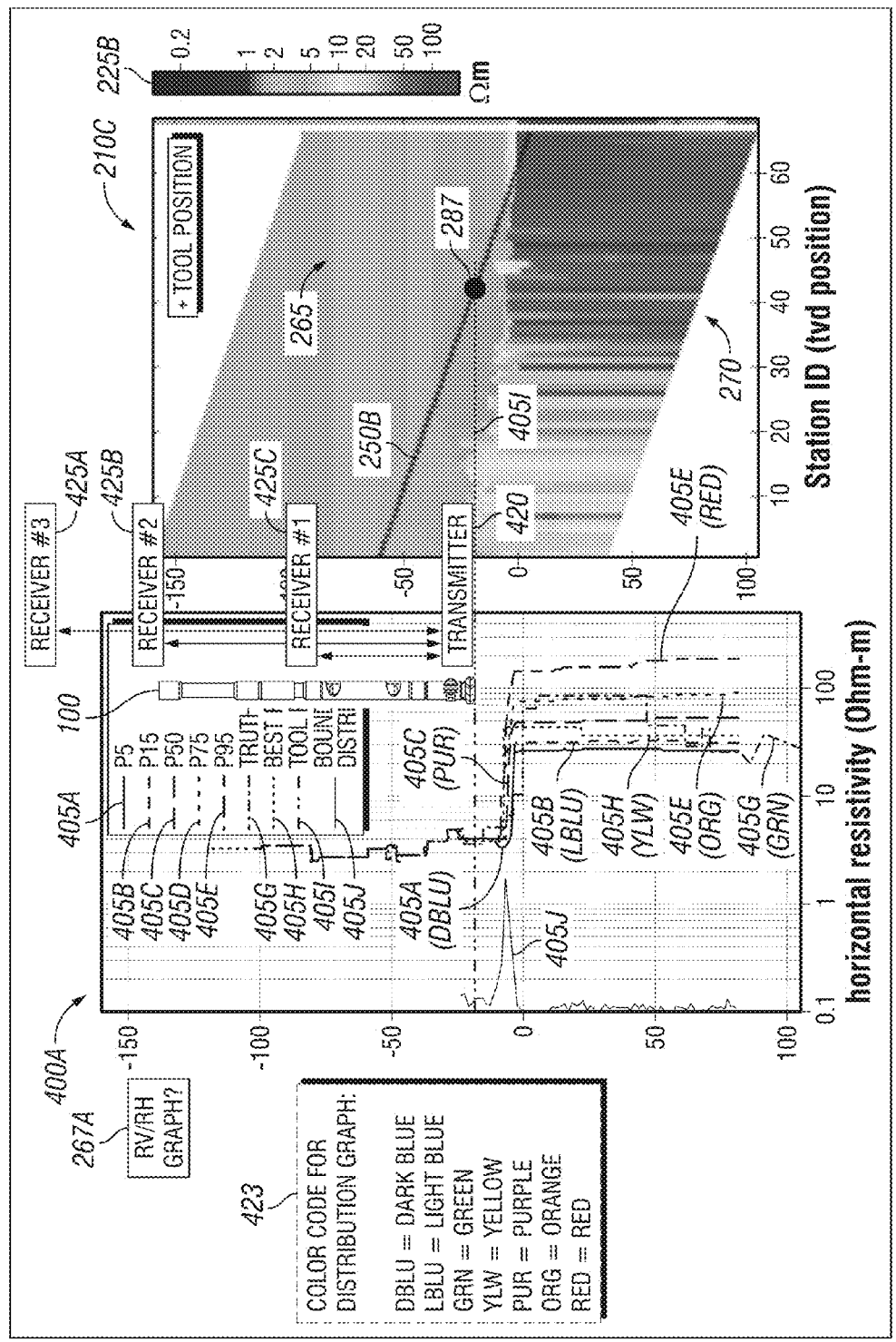
FIG. 2C is a user interface with a graph that plots a distribution of all estimated formations generated by look-ahead—measurements in a drilling operation that is uniquely coupled to a look-ahead model graph and an image illustrating a relative drilling tool length.
Figure 2E:
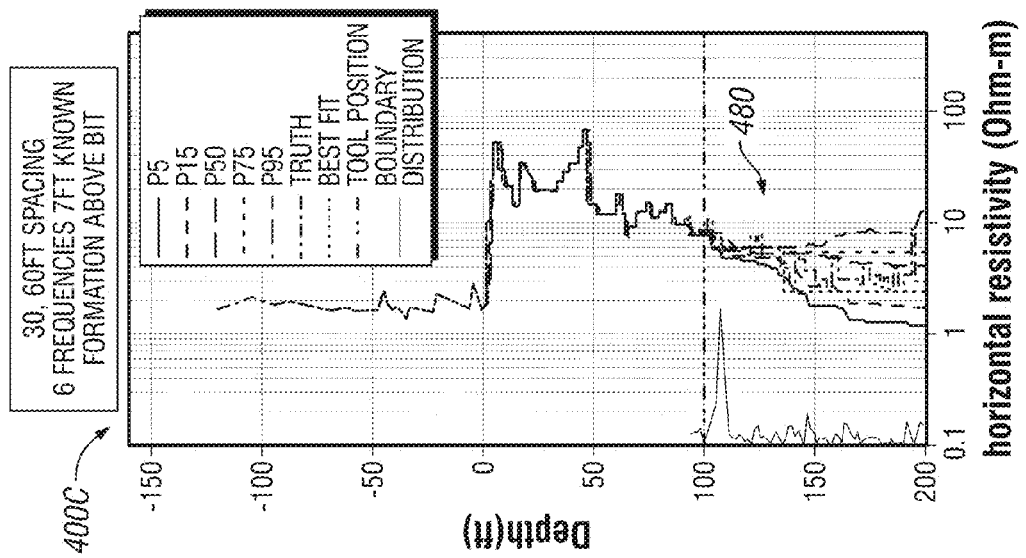
Figure 2D:
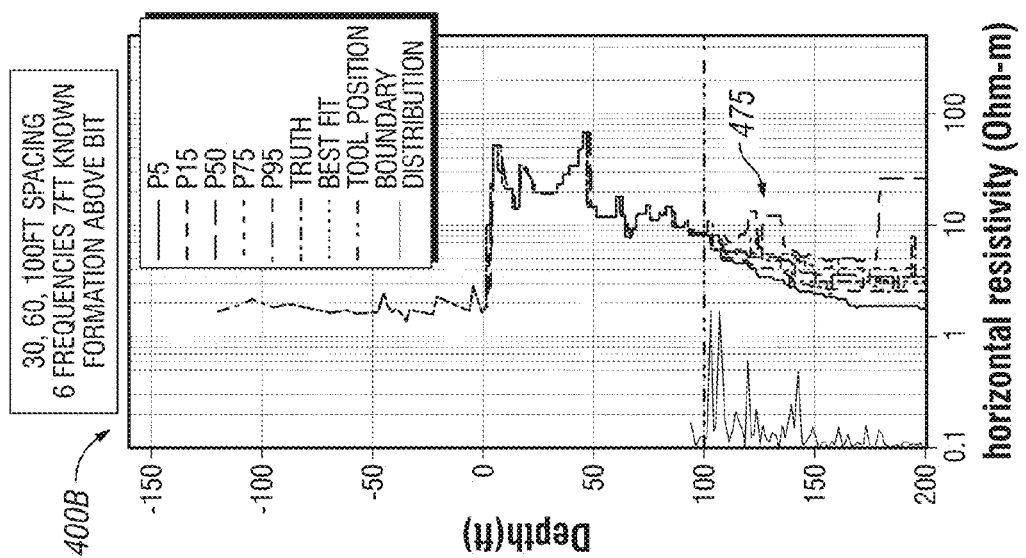
Figure 2F:
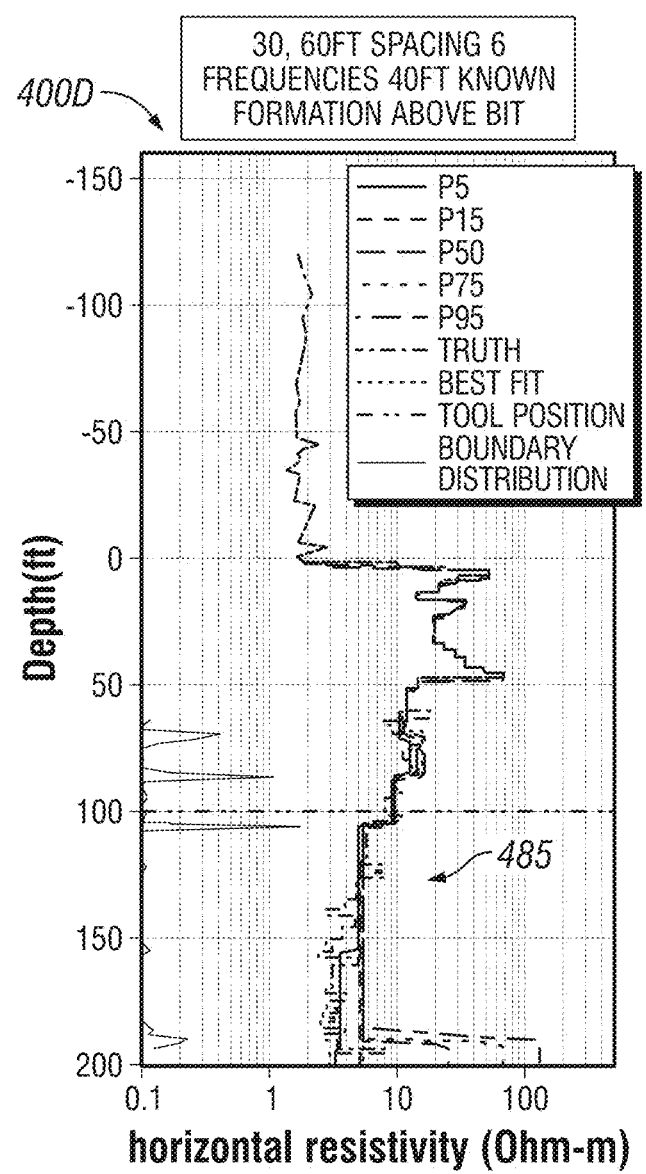
Figure 2G:
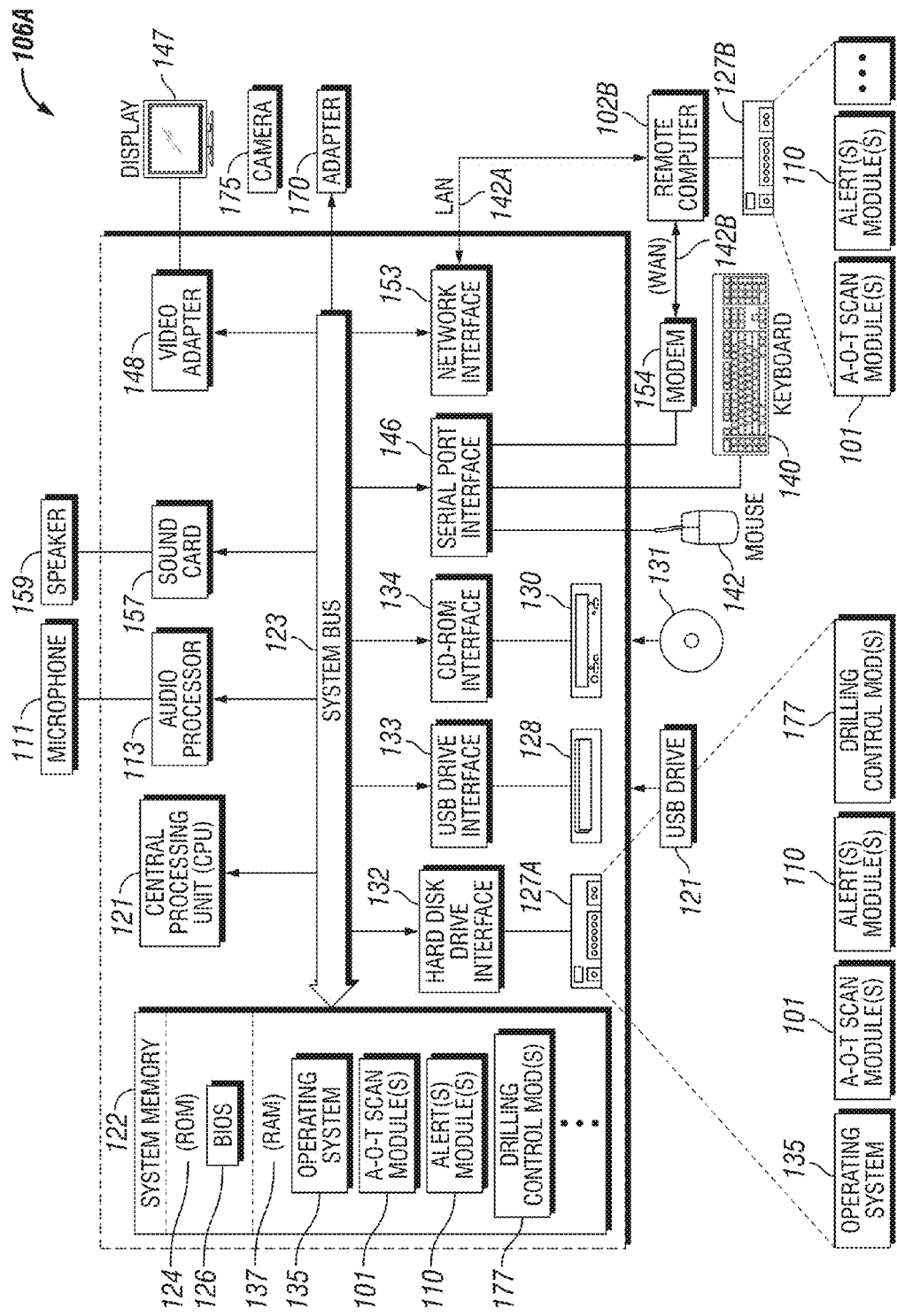
Figure 3:
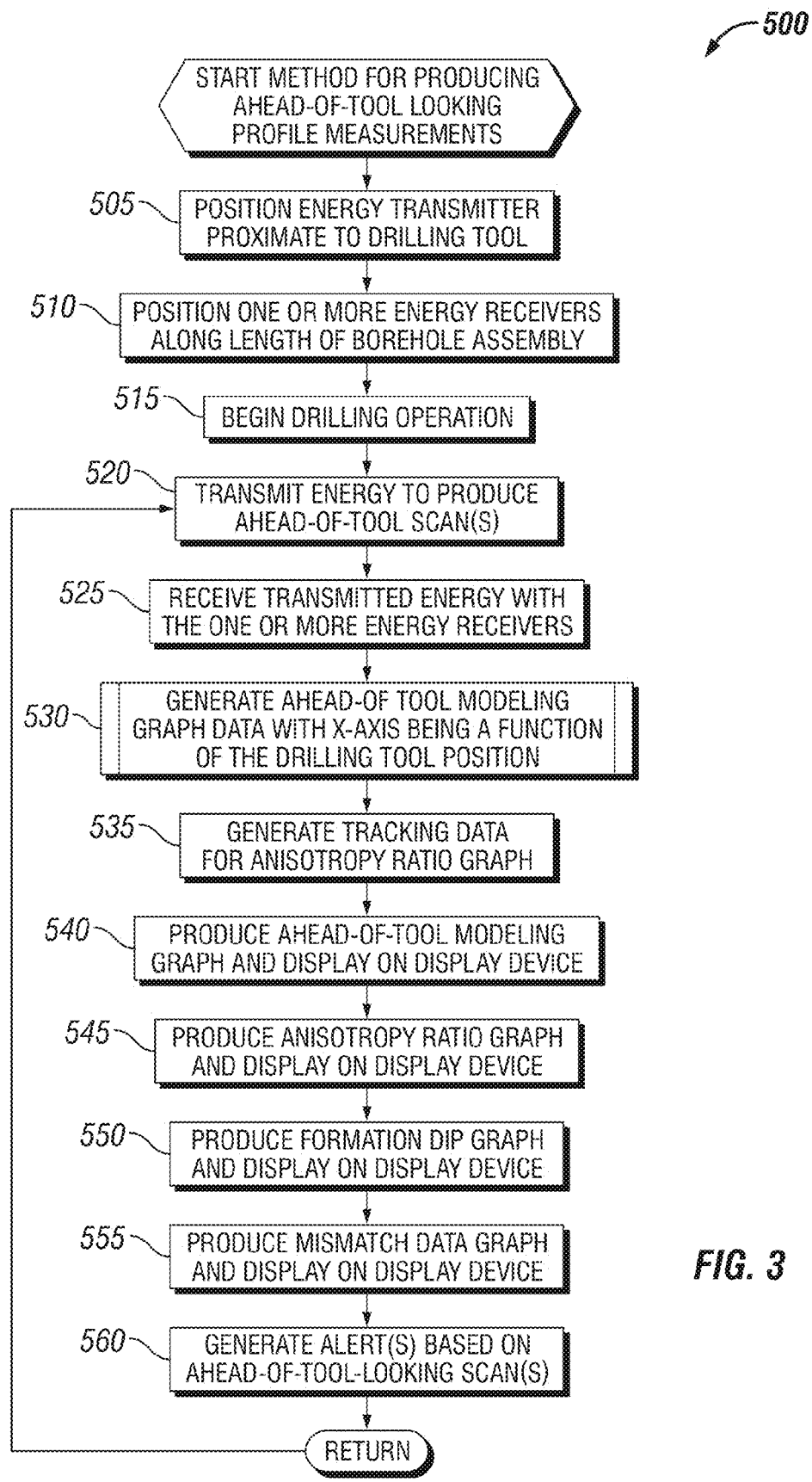
Figure 4:
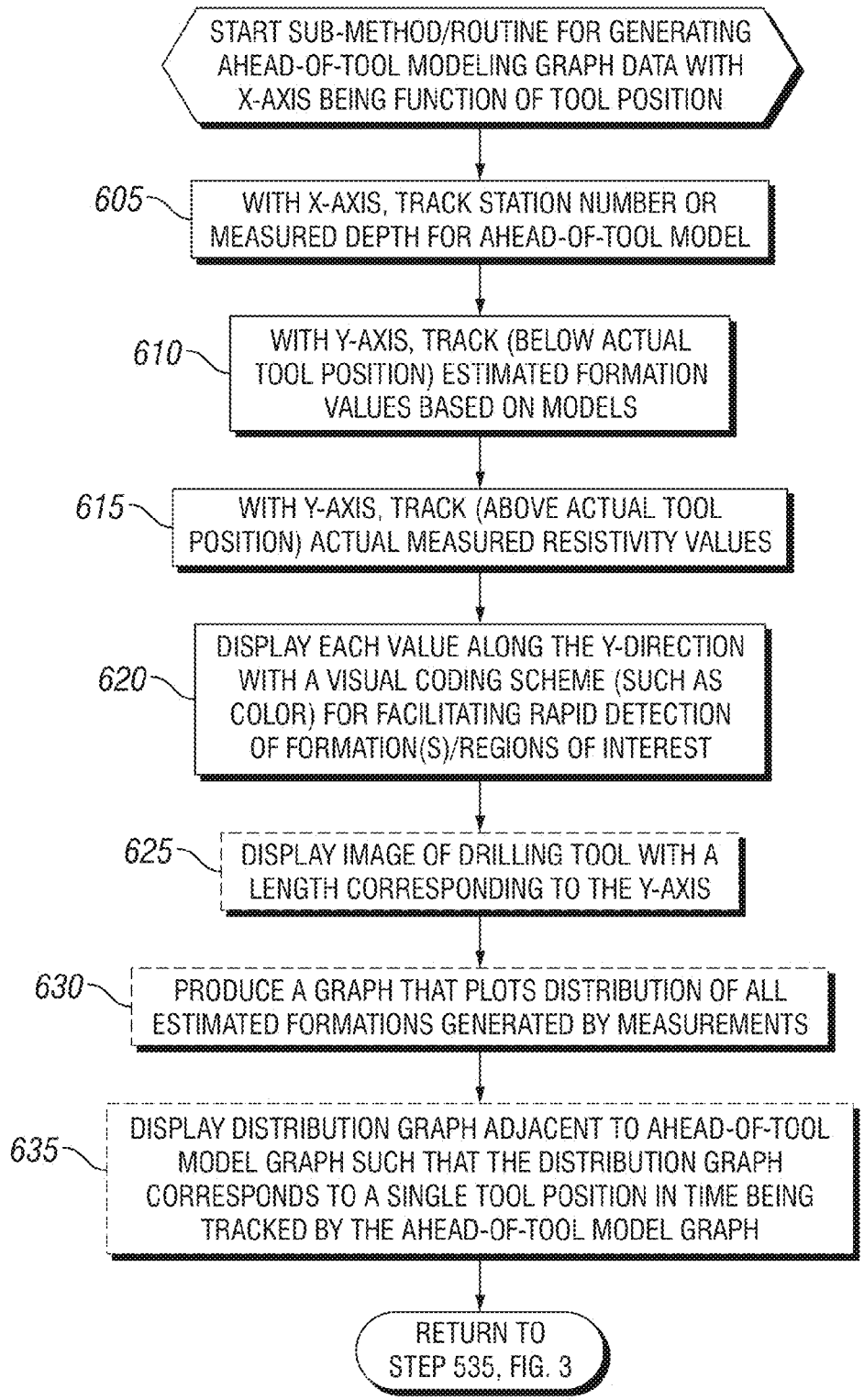

FIGS. to 2D, 2E, and 2F are diagrams illustrating additional graphs which plot a distribution of all estimated formations generated by a set of look-ahead measurements in a drilling operation;

FIG. 2G is a diagram of some computer based elements for producing look-ahead profile measurements in a drilling operation;

FIG. 2H is a diagram of a resistivity tool capable of producing look-ahead measurements;

FIG. 3 is a flowchart illustrating a method for producing look-ahead profile measurements in a drilling operation; and FIG. 4 is a flowchart illustrating a sub-method or routine of FIG. 3 for generating look-ahead modeling graph data with the x-axis being a function of a position of a drilling tool in a drilling operation.

DETAILED DESCRIPTION

Figure 1A:
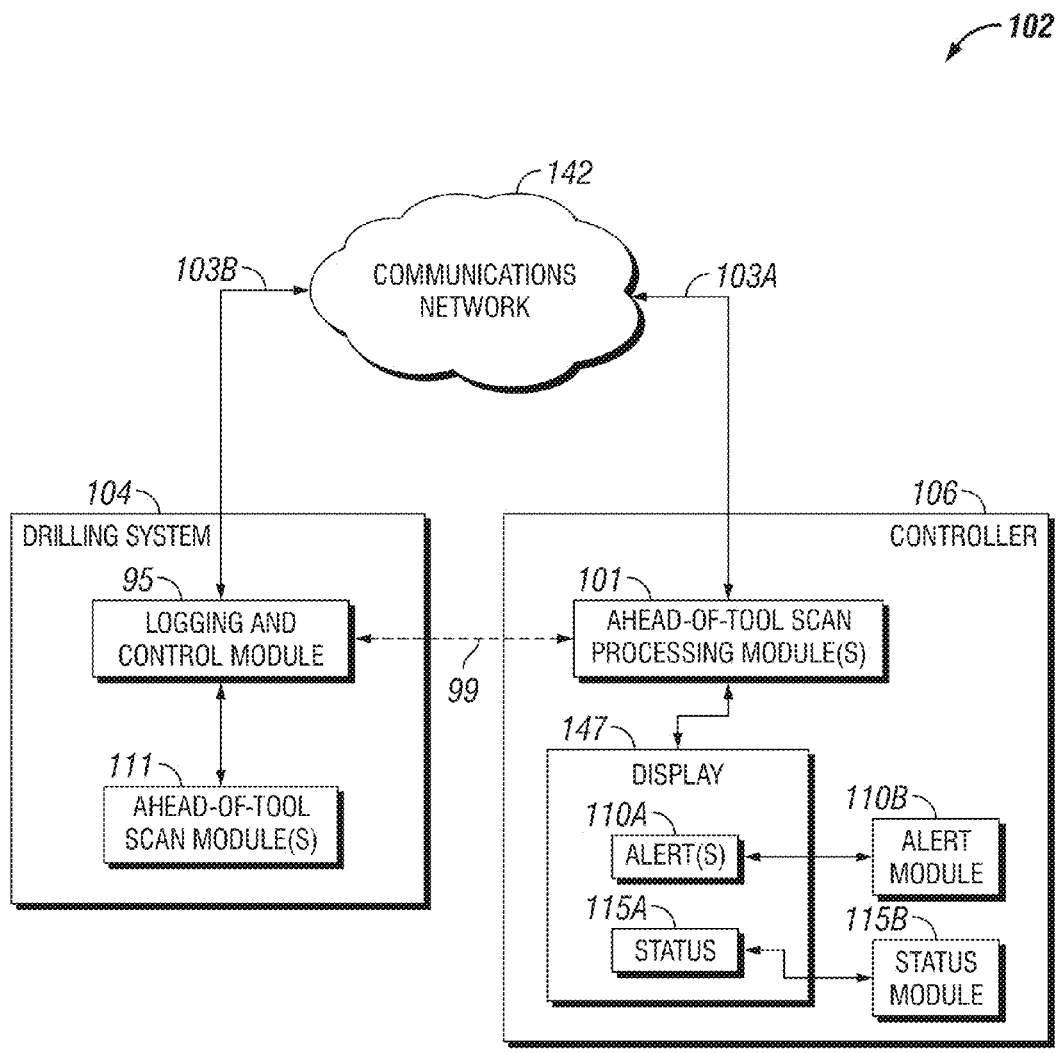
FIG. 1A is a diagram of a system for producing look-ahead profile measurements in a drilling operation.

Referring initially to FIG. 1A, FIG. 1A is a diagram of a system 102 for producing look-ahead profile measurements in a drilling operation. The system 102 includes a controller 106, an look-ahead scanning device 111, and look-ahead scan processing module(s) 101. Further details of the look-ahead scanning device 111 will be described below in connection with FIGS. 2A-2H.

The system 102 also includes a drilling system 104 which has a logging and control module 95. The controller 106 further comprises a display 147 for conveying alerts 110A and status information 115A that are produced by an alerts module 110B and a status module 115B. The display 147 is coupled to the look-ahead scan processing module(s) 101. The controller 106 may communicate with the drilling system 104 via a communications network 142.

The controller 106 and the drilling system 104 may be coupled to the communications network 142 via communication links 103. Many of the system elements illustrated in FIG. 1A are coupled via communications links 103 to the communications network 142.

The links 103 illustrated in FIG. 1A may comprise wired or wireless couplings or links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof. The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The drilling system 104 and controller 106 of the system 102 may have RF antennas so that each element may establish wireless communication links 103 with the communications network 142 via RF transceiver towers (not illustrated). Alternatively, the controller 106 and drilling system 104 of the system 102 may be directly coupled to the communications network 142 with a wired connection. The controller 106 in some instances may communicate directly with the drilling system 104 as indicated by dashed line 99 or the controller 106 may communicate indirectly with the drilling system 104 using the communications network 142.

The look-ahead scan processing module(s) 101 may comprise software or hardware (or both). The look-ahead scan processing module(s) 101 may generate the alerts 110A relating to subsurface formation profiles that may be rendered on the display 147. The alerts 110A may be visual in nature but they may also comprise audible alerts as understood by one of ordinary skill in the art.

The display 147 may comprise a computer screen or other visual device. The display 147 may be part of a separate stand-alone portable computing device that is coupled to the logging and control module 95 of the drilling system 104. The logging and control module 95 may comprise hardware or software (or both) for direct control of a borehole assembly 100 as understood by one of ordinary skill in the art.

Figure 1B:
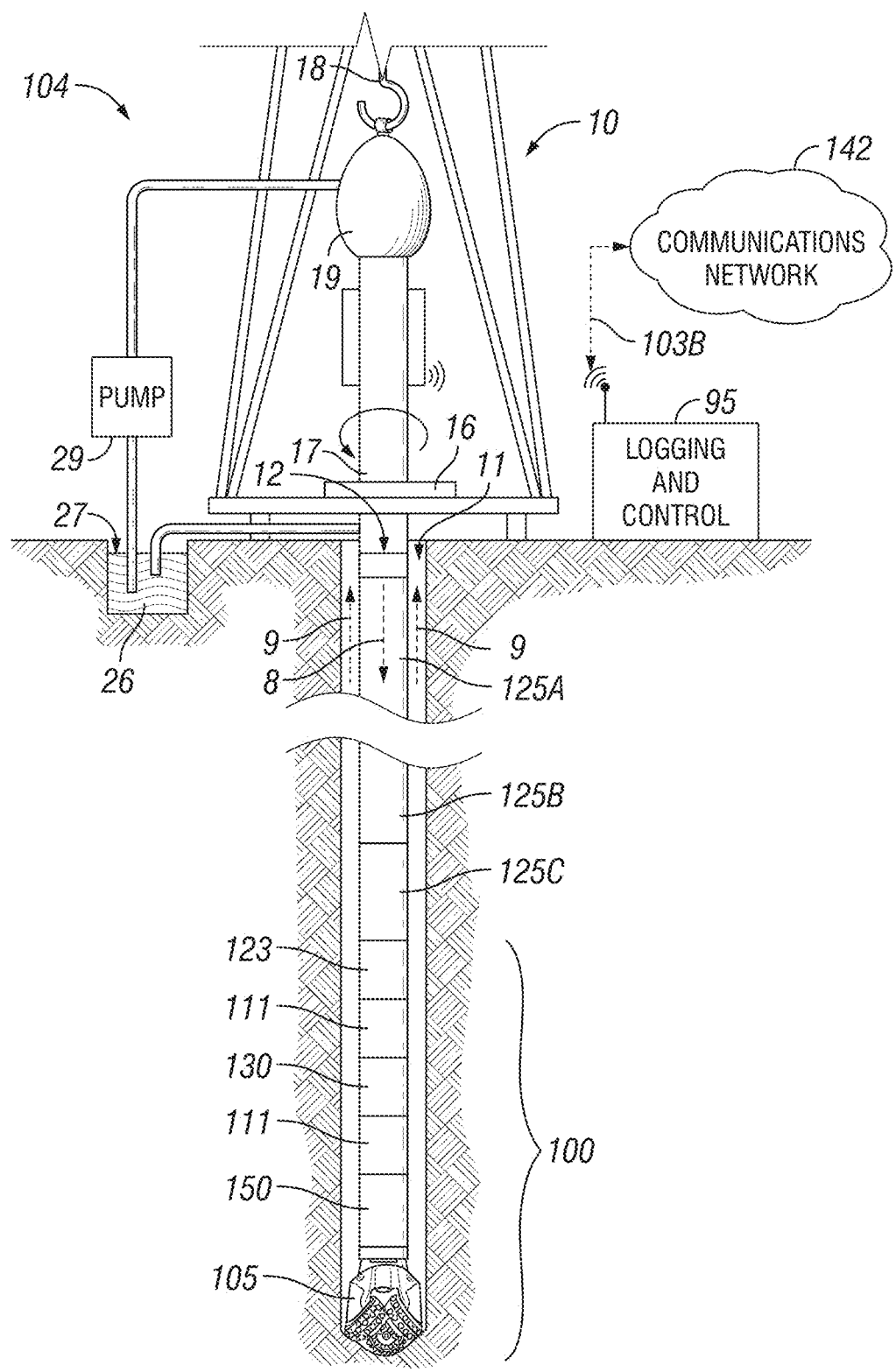
FIG. 1B is a diagram of a wellsite drilling system that forms part of the system illustrated in FIG. 1A.

FIG. 1B illustrates a wellsite drilling system 104 that forms part of the system 102 illustrated in FIG. 1A. The wellsite can be onshore or offshore. In this system 104, a borehole 11 is formed in subsurface formations by rotary drilling in a manner that is known to one of ordinary skill in the art. Embodiments of the system 104 can also use directional drilling, as will be described hereinafter. The drilling system 104 comprises the logging and control module 95 as discussed above in connection with FIG. 1A.

A drill string 12 is suspended within the borehole 11 and has a borehole assembly ("BHA") 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by mechanisms not shown, which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18.

As is known to one of ordinary skill in the art, a top drive system could alternatively be used instead of the kelly 17 and rotary table 16 to rotate the drill string 12 from the surface. The drill string 12 may be assembled from a plurality of segments 125 of pipe and/or collars threadedly joined end to end.

In the embodiment of FIG. 1B, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this system as understood by one of ordinary skill in the art, the drilling fluid 26 lubricates the drill bit 105 and carries formation cuttings up to the surface as it is returned to the pit 27 for cleaning and recirculation.

The bottom hole assembly 100 of the illustrated embodiment may include a logging-while-drilling (LWD) module 120, a measuring-while-drilling (MWD) module 130, a rotosteerable system and motor 150, and drill bit 105. The LWD module 120 is housed in a special type of drill collar, as is known to one of ordinary skill in the art, and can contain one or a plurality of known types of logging tools.

It will also be understood that more than one LWD 120 and/or MWD module 130 can be employed, e.g. as represented at 120A and 120B. (References, throughout, to a module at the position of 120A may include a module at the position of 120B as well.) The LWD module 120 includes capabilities for measuring, processing, and storing information, as well as for communicating with the surface equipment. In the embodiment of FIG. 1B, the first LWD module 120A and second LWD module 120B may include directional resistivity measuring devices. The spatial arrangement and sequence of the LWD modules 120 relative to other parts of the borehole assembly ("BHA") 100 may be interchanged as recognized by one of ordinary skill in the art. These LWD modules 120 may be operated to produce look-ahead scans as will be described below in connection with FIG. 2H. When producing look-ahead scans, the LWD modules 120 may form the look-ahead scanning device 111 referenced in FIG. 1A.

The MWD module 130 is also housed in a special type of drill collar, as is known to one of ordinary skill in the art, and can contain one or more devices for measuring characteristics of the drill string 12 and drill bit 105. The MWD module 130 may further includes an apparatus (not shown) for generating electrical power to the downhole system 100.

This apparatus may include a mud turbine generator powered by the flow of the drilling fluid 26, it being understood by one of ordinary skill in the art that other power and/or battery systems may be employed. In the embodiment, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The foregoing examples of wireline and drill string conveyance of a well logging instrument are not to be construed as a limitation on the types of conveyance that may be used for the well logging instrument. Any other conveyance known to one of ordinary skill in the art may be used, including without limitation, slickline (solid wire cable), coiled tubing, well tractor and production tubing.

The directional deep-reading logging-while-drilling ("LWD") drilling tool 120 may include a sensor array as will be described in further detail below in connection with FIG. 2H. The sensor array may comprise transmitter antennas and receiver antennas as understood by one of ordinary skill in the art. The antennas may operate at 2 MHz and 400-kHz standard operating frequencies as well as 100-kHz frequencies as understood by one of ordinary skill in the art.

The tool 120 may also include magnetometers and accelerometers that can provide reference directional orientation data for the tool. In addition to its directional capability, the tool 120 may provide relatively deeper measurements than most conventional LWD resistivity tools 120. The tool 120 may detect dip, anisotropy, and formation boundaries.

The substantially real-time bidirectional drill string telemetry hereof, in conjunction with the capabilities of the directional resistivity logging tool, as described, improves performance of geo-steering by increasing the amount of data at the surface and the speed and precision of directional drilling control.

The LWD tools 120 of the system 102 may isolate the induced electrical currents produced in front of the drill bit 105. These induced electrical currents in front of the drill bit 105 are generated by a the tool 120 which is also referred to the transmitter 420 (in FIG. 2E) which is adjacent or fairly proximate to the drill bit 105 (positioned about 5.0 feet away from the drill bit 105) and analyzed by the plurality of receivers 425C, 425B, and 425A (See FIG. 2E) that can be positioned at about thirty feet, at about sixty feet, and about one-hundred feet as illustrated in FIG. 2E. With this antenna configuration, it is now possible in real-time to track the look-ahead proximity of a reservoir top with depth of investigation up to about one-hundred feet and to stop before entering any potentially provoke problematic formation regions with the drill bit 105.

The system 102 takes the resistivity values generated in front of the drill bit 105 and uses inversions to produce values for the tool position (see position history lines 250 of FIG. 2A) and resistivity in a stack of layers 270 that explains the measured resistivity values. This look-ahead system 102 is quite different from the conventional art. As noted previously, the conventional art does not utilize look-ahead measurements or scans but instead looks at data collected behind the borehole assembly 100 in order to predict formations that may be found in front of the drill bit 105 as understood by one of ordinary skill the art.

Further, other types of energy besides radio-frequency energy may be used to produce look-ahead measurements. For example, other types of energy may include, but are not limited to, acoustic energy. This acoustic energy may be propagated with a frequency between about 0.5 kHz to about 8.0 kHz. Other types of energy not specifically mentioned are included within the scope of this disclosure.

FIG. 2A is a diagram of a user interface 200A comprising an anisotropy ratio graph 205 and a look-ahead model graph 210A that are generated from the look-ahead scans produced by the look-ahead scanning device 111. As noted previously, the look-ahead scanning device may comprise either LWD tool 120 when the tool 120 emits look-ahead scans relative to the drill bit 105. Specifically, the configuration antennas for the LWD tool 120 may provide measurement with different depths of investigation.

An inversion uses these look-ahead measurements may provide a formation with resistivity contrast (layered formation model) that closely match the measurement at each measured depth (MD) for the borehole assembly 100. Usually, the inversion is performed on a range of MD measurements (window) to enhance its results.

As the borehole assembly 100 drills towards an area of interest such as oil or shale, the accuracy of the front view (relative to drill bit 105) increases as the drill bit 105 gets closer to the area of interest. More information becomes available as the assembly 100 gets closer to a profile and/or other the areas of interest. As noted above, the look-ahead scans or look-ahead measurements being made by the look-ahead scanning device 111 may comprise electromagnetic (EM) resistivity measurements as understood by one of ordinary skill in the art.

The measurements from the look-ahead scanning device may reveal different layers of the areas of interest in which each layer (below the drill bit 105) may have a different resistivity due to the different chemical and physical makeup of the separate layers in front of the drill bit 105 being measured. Each layer may have a total horizontal resistivity ($R_H$) as understood by one of ordinary skill in the art.

With the user interface 200A, different resolutions may be selected in order to see details of resistivity measurements with greater ease. The display 200 allows vertical resistivity measurements ($R_V$) to be viewed and the display 200 allows changes to boundary conditions on the fly in order to improve resistivity measurements. With this display 200A, tool (borehole assembly 100) depth or actual measured depth or other depth options may be viewed as understood by one of ordinary skill in the art.

The look-ahead model graph 210A of the user interface 200A in the vertical direction provides a view of layers 270 in front of the drill bit 105. The horizontal direction, or x-axis, of the look-ahead model graph 210 logs the vertical descent of the drill bit 105 according to time through the layers 270 being drilled.

Line 250B denotes the approximate position of the drill bit 105 as it progresses through layers 270. Line 250B may be referenced as the drill bit position history line 250B. Each point 245B of the drill bit position history line 250B corresponds to a single position in time (x-axis) relative to the measured vertical distance on the y-axis of look-ahead model graph 210A.

As the borehole assembly 100 progresses through the layers 270, the areas of interest in front of the drill bit 105 may become more defined and more clear as the distance between the drill bit 105 and the boundary to the layers of interest 270 decreases. The front view of the layers 270 provided by the look-ahead model graph 210A allows an operator to make decisions about the drilling operation such as stopping the drilling operation or to change the angle of inclination or attack with respect to the areas of interest.

The information provided in the look-ahead graph 210A, moving from left to right, is more and more accurate information about the same set of layers. Therefore, each visually coded column 240B refers to the same layer of interest (i.e.—the same formation) except that each column 240B moving to the right of the graph 210A has increased accuracy as the borehole assembly 100 progresses closer and closer to the formation through the layers represented by data 270. Basically, each column 240B of data in the graph 210A, relates to the same formation but provides additional information compared to each column found on the left of a particular column 240B being reviewed.

In an embodiment, visual coding schemes may be utilized to enhance differences between resistivity measurements displayed with the look-ahead graph 210A. Such visual coding schemes may include utilizing grayscale shading, color coding, and using different graphical symbols, and other like visual coding schemes.

In a color embodiment, the look-ahead graph 210A may log resistivity measurements in which certain colors represent different levels of resistivity measurements. For example, the color red may signify increased resistivity measurements while the color blue signifies low or decreased resistivity measurements. The embodiment illustrated in FIG. 2A is shown with a grayscale visual coding technique but one of ordinary skill the art recognizes that a color coding technique could easily be substituted for the grayscale visual coding technique displayed in this figure.

The look-ahead graph 210A across the x-axis may comprise about 86 points (although only 66 points are illustrated in FIG. 2A) which define columns 240B that extend upward and downward relative to the position history line 250B and may run parallel to the y-axis. The points shown across the x-axis can be a variety of suitable numbers, as may be recognized by one of skill in the art. Each column 240B may represent measurements recorded and calculated by the drill system 102. Additional or fewer columns 240B of data may be employed without departing from the scope of this disclosure as understood by one of ordinary skill in the art.

Referring to column 240B, data 265 above the position history line 250B represents actual measured data by the LWD tool 120 while data 270 below the line represents estimated data based on formation models derived from look-ahead measurements from the LWD tool 120. Specifically, the data 270 representing formations below the line 250B represents estimated data based on inversions of the resistivity measurements generated by the LWD tools 120 as understood by one of ordinary skill in the art.

The data 270 below the position history line 250B may predict what type of layers that the drill bit 105 may penetrate through when it reaches a layer. The points forming the position history line 250B on the left side are older data points while points on the right hand side of the display 200 are the newer data points being collected by the look-ahead scanning device 111 that may comprise the LWD tools 120.

A true formation reading is provided on the far right hand side of the display 200 in the far right-hand column 230B1 relative to the formation model graph 210A. The look-ahead graph 210A may be characterized as a tracking display since it presents historical data previously calculated by the resistivity measurements. As the borehole assembly 100 gets closer to an actual subsurface formation, the accuracy of the measurements and the corresponding inversions increase. One can see that look-ahead graph 210A offers a tracking feature that allows an operator and/or system to assess (evaluate) the inversion quality as the top of a reservoir is approached.

As the position of the reservoir top becomes better refined, the closer the borehole assembly 100 is to the layer being estimated with the look-ahead resistivity measurements. In anisotropic cases, when inverting with respect to the horizontal resistivity ($R_H$) and the vertical resistivity ($R_V$), the look-ahead graph 210A which is a tracking displays for $R_H$ may be displayed simultaneously with the anisotropy ratio graph 205 that shows $R_V/R_H$ as will be describe in further detail below.

The $R_V/R_H$ graph 205 provides the operator with a better idea of the actual depth and shape of the area of interest (which can be a formation feature, if detected). Visual coding schemes, such as gray-scale or color, may help the operator understand the quality of data that has been tracked and calculated by the system 102 with the look-ahead scans.

In each of the look-ahead graphs 210A-210C illustrated in FIGS. 2A-2C, data above each point in the position history line 250 comprises data 265 which has been measured accurately by the log while drilling tools/modules 120 while data 270 below the line 250 represents regions being scanned in front of the drill bit 105 and which are being measured and calculated based on theoretical principles which may utilize inversions, such as Gauss-Newton or Monte Carlo inversions. In reality, the measurements calculated from each point in the position history line 250 originate from a transmitter 420 (See FIG. 2H) which, in this example, is positioned approximately 5.0 feet above the drill bit 105. One of ordinary skill in the art recognizes that other distances between the drill bit 105 and the transmitter may work and are within the scope of this disclosure.

In the embodiment of FIG. 2A, for those columns which have a light shade or white color on the far left section of the look-ahead graph 210A, these lighter shades may mean the quality of the inversion of the resistivity data may have been low and inaccurate. As the columns of data progress to the right in the look-ahead graph 210A, in which the borehole assembly 100 becomes closer to a formation or an area of interest, the quality of data increases as indicated by columns 240 which contain darker shaded segments as well as light shaded segments in which the dark shaded segments are positioned above or on top of the light shaded segments (See generally in regions 253 of FIG. 2A).

In those columns 240 having both dark shaded elements and light shaded elements in a stacked arrangement (such as in region 253), the dark shaded elements may indicate a high resistivity area of interest which is likely a formation. Meanwhile, the light shaded elements may indicate a lower resistivity for an area of interest which is likely the absence of a formation.

The left part of the display 200A has an anisotropy ratio graph 205 which may utilize a grayscale visual presentation of data for the layers 260 being drilled. Anisotropy measurements provide the ratio of the vertical resistivity to the horizontal resistivity as understood by one of ordinary skill in the art.

The vertical resistivity is typically greater than horizontal resistivity and therefore the ratio of vertical resistivity to horizontal resistivity is greater than one. If the horizontal resistivity and the vertical resistivity are equal to each other, then the layer being scanned or evaluated is characterized as being isotopic.

Similar to the look-ahead graph 210A, the anisotropy ratio graph 205 may also provide a position history line 250A which directly corresponds to the position history line 250B of the formation model graph 210A. The data 260 below the position history line 250B may represent layers being drilled into by the borehole assembly 100 while the data 255 may represent layers that have been penetrated by the borehole simply 100 and have been accurately measured by the LWD modules 120.

In terms of identifying desired mediums such as oil or gas, typically the horizontal resistivity is considered to be the more important of these two resistivity parameters. However, the vertical resistivity parameter is needed in most cases to solve for the horizontal resistivity parameter as understood by one of ordinary skill in the art.

Referring now to the smaller rectangular graph 215 on the lower left hand side of the display 200A may provide data on the formation dip. The formation dip estimates the layers of the formation from an angled scan as opposed to a direct in-line measurement (180°) scan relative to the drill bit 105 as provided by the anisotropy ratio graph 205 and the look-ahead graph 210A. The horizontal or x-axis of the graph 215 is in direct alignment with the x-axis of the anisotropy ration graph 205. For example, the column 240A of the anisotropy ratio graph 205 may extend to the graph 215 and intersect the formation dip readings of graph 215 at point 275.

The far right smaller rectangular graph 220 positioned beneath the look-ahead graph 210A may present mismatch in the data or errors in the inversion calculations used for the data 270 below the position history line 250B. As understood by one of ordinary skill in the art, parameters associated with an inversion are not easily calculated and are prone to errors and subject to changing boundary conditions and estimates.

Similar to the alignment between the anisotropy ratio graph 205 and the left smaller graph 215, the x-axis of the right smaller graph 220 may be in direct alignment with the x-axis of the look-ahead graph 210. For example, the column 240B of the look-ahead graph 210A may extend to the graph 220 and intersect the mismatch readings of graph 220 at point 280.

The look-ahead graph 210A may be used for a vertical well or a deviated well in which the borehole assembly 100 eventually crosses the boundary layer of interest. The look-ahead graph 210 may predict the properties of the layers before the borehole assembly 100 crosses into the layers.

The user interface 200A may provide the operator with various options which may be selected. For example, an operator may select the distribution graph button 267A in the user interface 200A in order to generate the distribution graph 400A as illustrated in FIG. 2C. Further details about the distribution graph 400A will be described below in connection with FIG. 2C.

Referring now to FIG. 2B, this figure is a diagram illustrating a visual coding scheme that may be employed in the look-ahead modeling graph 210A of FIG. 2A. The visual coding scheme of this embodiment comprises color coded columns C1-C5 and 230B2. Column 225B provides a color coding key or color scale. Many parts of the look-ahead modeling graph 210B correspond to the look-ahead modeling graph 210A of FIG. 2A.

The color coding scheme has been represented with letters since only black-and-white images may be presented in this disclosure. One of ordinary skill in the art recognizes that the actual colors represented by the color codes would be presented in a conventional color display such as a display 147 of a computing device 106 which will be described below in connection with FIG. 2G.

In the embodiment illustrated in FIG. 2B, the letter "G" represents the color green; the letter "R" represents the color red; the letter "P" represents the color purple; the letter "T" represents the color tan; the letter "Y" represents the color yellow; the letter "B" represents the color blue; the letter "Br" represents the color brown; and the letters "LB" represents the color light blue as indicated by the color scale 305 in FIG. 2B. One of ordinary skill in the art recognizes that the color scale or color key 305 of FIG. 2B would not be needed in an actual color display.

FIG. 2C is a user interface 200B that includes a graph 400A that plots a distribution of all estimated formations generated by look-ahead measurements in a drilling operation. Graph 400A is uniquely coupled to a look-ahead graph 210C and an image of a bore hole assembly 100 illustrating a relative drilling tool length. As noted previously, an operator may select a distribution graph button 267A of FIG. 2A in the user interface 200A in order to generate the distribution graph 400A as illustrated in FIG. 2C. Similarly, the user interface 200B may also comprise an Rv/Rh button 267B so that the operator may toggle between the user interface 200A that comprises the Rv/Rh ratio graph 205 and the user interface 200B that comprises the distribution graph 400A in FIG. 2C.

Graph 400A of the user interface 200B illustrates a statistical distribution of various solutions 405A-405H and may be referred to as a resistivity plot. The vertical y-axis of the resistivity plot represents depth while the horizontal x-axis represents resistivity in Ohm-m. The resistivity is higher in regions identified with the lighter shaded lines (such as with the color RED if a color visual coding scheme is employed) while resistivity is lower in those regions marked with darker shaded lines (such as with the color BLUE if the color visual coding schemes employed).

The entire graph 400A of FIG. 2E corresponds with a single point 287 of interest in the position history line 250B of the look-ahead graph 210C. See how horizontal line 405I which flows horizontal across graph 400A and intersects the position history line 250B of the look-ahead graph 210C at point 287.

The distribution graph 400A in combination with the look-ahead graph 210C may be very helpful in detecting oil-water contact (OWC) as understood by one of ordinary skill may art. The look-ahead graph 210C directly corresponds with the look-ahead graphs 210A and 210B of FIGS. 2A-2B. Each point of the position history line 250B of the look-ahead graph 210C will have its own corresponding graph 400A comprising a statistical distribution of various solutions 405A-405H.

The statistical distribution of various solutions 405A-405J illustrated in graph 400A are derived from an inversions. For example, each solution 405 which comprises a single line in graph 400A may be a solution derived from a Monte Carlo inversion as understood by one of ordinary skill in the art. The graph 400A of FIG. 2E basically illustrates a distribution of solution possibilities for a formation and which corresponds to a single position of the borehole assembly at a particular point in time, such as at point 287 of the look-ahead graph 210C.

As noted previously, and referring now again to look-ahead graph 210C, looking at a single point 287 along the position history line 210C of FIG. 2B, each point defines a vertical column of information in which the information (data) 265 in the column above a point 287 has been measured accurately and is known, meanwhile, the information (data) 270 in the column below each point is unknown and is being estimated using various mathematical techniques as understood by one of ordinary skill in the art, such as, but not limited to, Monte Carlo type inversions.

As the borehole assembly 100 progresses from one position to the next (such as in a vertical fashion in a vertical well), the uncertainty with respect to the resistivity distribution illustrated in graph 400A for a given layer is likely to go down. In the embodiment illustrated, the spike 405J in graph 400A represents the uncertainty with respect to the position of the layers.

The uncertainty with respect to the resistivity as one looks at the distribution for each point as you progress down the position history line 250B towards the right of the look-ahead graph 210C, should also go down and which may be reflected with a color coding scheme, such as providing an increased number of lighter shaded lines 405. The graph 400A provides data on the resistivity as well as anisotropic levels for particular layers at a particular position of the borehole assembly which corresponds to a single point in the position history line 250B of the look-ahead graph 210C.

Access to certain data channels from the resistivity tools contained with the LWD modules 120 are important elements to the system. This distribution graph 400A and the look-ahead graph 210C may be produced with a thirty foot receiver channel 425C, a sixty foot receiver channel 425B, and a one-hundred foot receiver channel 425A that are positioned along the borehole assembly 100 as illustrated in FIG. 2H, which is a diagram of a resistivity tool capable of producing look-ahead measurements. While the exemplary embodiment illustrated in FIG. 2H has a single transmitter 420 close to the bit 105 that is used in combination with multiple receivers 425, one of ordinary skill in the art recognizes that this transmitter-receiver configuration may be reversed due to reciprocity. Therefore, the LWD modules 120 may comprise a single receiver closer to the bit 105 in combination with multiple transmitters (not illustrated).

The x-axis of the look-ahead graph 210C may display the position of the borehole assembly 100 relative to the borehole as the tool penetrates through layers of the earth. According to other embodiments, the x-axis could be displayed in units of time such as in minutes, seconds, hours etc. The x-axis of look-ahead graph 210C may be any function of time with respect to the position of the borehole assembly 100.

The y-axis of the distribution graph 400A and the look-ahead graph 210C is generally the true vertical depth (TVD) of the borehole. The measurements are usually taken at uniform instances in time. This is why the position history line 250B of the look-ahead graphs 210A, B, and C in FIGS. 2A-2C is straight. If the TVD measurements were taken over non-uniform or uneven instances in time, then the position history line 250B would not be straight, it would likely oscillate.

Referring to distribution graph 400A in a top right section, a graphical representation of the bore hole assembly 100 used in the drilling system 102 is provided. One end of the tool 100 (usually corresponding to a bottom that comprises the drill bit 105) is provided with a horizontal line 405I that couples the position history line 250B of FIG. 2E with the distribution of solution possibilities 405A-H from inversions for a formation.

Specifically, distribution graph 400A represents a distribution of solutions from inversions for a single column on the position history line 250B of the look-ahead graph 210C. In other words, the distribution graph 400A of FIG. 2E corresponds to only one column of the look-ahead graph 210C of FIG. 2E.

The borehole assembly 100 illustrated in the top right section of graph 400A in the user interface 200B provides a representation of the actual borehole assembly 100. The representation of the assembly 100 is scaled such that the length of the borehole assembly 100 illustrated in the display 200B corresponds with the actual size of the tool compared to the vertical measured depth scale for both the distribution graph 400A and the look-ahead graph 210C.

The distribution graph 400A of FIG. 2E provides more information about the single column recorded in the look-ahead graph 210C. The distribution graph 400A of FIG. 2E provides a distribution of resistivities as calculated from inversions while also providing the uncertainties with respect to the resistivity calculations. The distribution graph 400A of FIG. 2E also provides the probabilities of uncertainties as understood by one of ordinary skill in the art.

Similar to the visual coding scheme described above in connection with FIG. 2 B, the distribution graph 400A may employ one or more types of visual coding schemes such as, but not limited to, grayscale shading, color coding, using different types of symbols, and other similar visual coding schemes. In the embodiment illustrated in FIG. 2C, a color coding scheme has been employed.

In this embodiment of the distribution graph 400A, the following color coding scheme was utilized: the phrase "DBLU" represents the color dark blue (see solution line 405A); the phrase "LBLU" represents the color light blue (see solution line 405B); the phrase "GRN" represents the color of green (see solution line 405G); the phrase "YLW" represents the color of yellow (see solution line 405H); the phrase "PUR" represents the color of purple (see solution line 405C); the phrase "ORG" represents the color orange (see solution line 405E); and the phrase "RED" represents the color red (see solution line 405E).

The color coding scheme is reflected in the color scale or color key 423 of the display 200B. One of ordinary skill the art recognizes that the color key 423 may not be needed if actual colors are utilized in the user interface 200B.

FIGS. to 2D, 2E, and 2F are diagrams illustrating additional graphs 400B-400D which plot a distribution of all estimated formations generated by a set of look-ahead measurements in a drilling operation. Graphs 400B-400D generally correspond with the first distribution graph 400A of FIG. 2C as described above. Only the differences between graph 400A and graphs 400B-400D will be described below.

One difference between the second, third, and fourth distribution graphs 400B-D is based on the number of transmitters and receivers used in the look-ahead scanning device 111 that comprises the LWD tools 120. For the second distribution graph 400B illustrated in FIG. 2D, three receivers 425 positioned at about 22-36 feet, about 53-68 feet, and about 88-115 feet relative to the drill bit 105 and utilizing six frequencies were employed to produce the inversions illustrated in this graph 400B. The resistivity detected above the drill bit 105 was set to approximately 7.0 feet above the drill bit 105. This receiver configuration for FIG. 2D is the same for the distribution graph 400A of FIG. 2C.

Meanwhile, for the third distribution graph 400C illustrated in FIG. 2E, two receivers 425 positioned at about 22-36 feet and about 53-68 feet spacing relative to the drill bit 105 and utilizing six frequencies were employed to produce the inversions illustrated in this graph 400C. The resistivity detected above the drill bit 105 was set to approximately 7.0 feet above the drill bit 105.

For the fourth distribution graph 400D illustrated in FIG. 2F, two receivers 425 positioned at about 22-36 feet and about 53-68 feet spacing relative to the drill bit 105 and utilizing six frequencies were employed to produce the inversions illustrated in this graph 400C. The resistivity detected above the drill bit 105 was set to approximately 40.0 feet above the drill bit 105.

Comparing each of the distributions illustrated in FIGS. 2D-2F, it was found that the distribution of solutions 475 in FIG. 2D provides the best sensitivity for formation detection and oil water contact (OWC) detection ahead of the drill bit 105 relative to the distribution of solutions 480, 485 found in the distribution graphs 400C-400B of FIGS. 2E-2F. As noted previously, the three receiver configuration with relatively shallow resistivity detection of distribution graph 400B is also utilized for distribution graph 400A and FIG. 2C described above.

Referring now to FIG. 2G, this figure is a diagram of some computer based elements in the controller 106 which include the look-ahead scan processing module(s) 101 of the wellsite drilling system 104 of FIG. 1A. The operating environment for the controller 106 may include a general-purpose computing device in the form of a conventional computer as understood by one of ordinary skill in the art.

Generally, the computer forming the controller 106 includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory ("ROM") 124 and a random access memory ("RAM") 127. A basic input/output system ("BIOS") 126, containing the basic routines that help to transfer information between elements within computer, such as during start-up, is stored in ROM 124.

The computer 106 can include a hard disk drive 127A for reading from and writing to a hard disk, not shown, a USB port 128 for reading from or writing to a removable USB drive 129, and an optical disk drive 130 for reading from or writing to a removable optical disk 131 such as a CD-ROM, a DVD, or other optical media. Hard disk drive 127A, USB drive 129, and optical disk drive 130 are connected to system bus 123 by a hard disk drive interface 132, a USB drive interface 133, and an optical disk drive interface 134, respectively.

Although the environment described herein employs hard disk 127A, removable USB drive 129, and removable optical disk 131, it should be appreciated by one of ordinary skill in the art that other types of computer readable media which can store data that is accessible by a computer, such as magnetic cassettes, flash memory cards, digital video disks, Bernoulli cartridges, RAMs, ROMs, and the like, may also be used in the operating environment without departing from the scope of the system 102. Such uses of other forms of computer readable media besides the hardware illustrated will be used in internet connected devices such as in a portable computing device, like a laptop computer or a handheld computer.

The drives and their associated computer readable media illustrated in FIG. 1G provide nonvolatile storage of computer-executable instructions, data structures, program modules, and other data for computer or client device 102A. A number of program modules may be stored on hard disk 127, USB drive 129, optical disk 131, ROM 124, or RAM 137, including, but not limited to, look-ahead scan processing module(s) 101 and an alert module 110, and other drilling control modules 177. Program modules may include, but are not limited to, routines, sub-routines, programs, objects, components, data structures, etc., which perform particular tasks or implement particular abstract data types.

A user may enter commands and information into the computer 106A through input devices, such as a keyboard 140 and a pointing device 142. Pointing devices may include a mouse, a trackball, and an electronic pen that can be used in conjunction with an electronic tablet. Other input devices (not shown) may include a joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

The camera 175 may also be connected to system bus 123 via an interface, such as an adapter 170. The camera 175 may comprise a video camera. The camera 175 can be a CCD (charge-coupled device) camera or a CMOS (complementary metal-oxide-semiconductor) camera. In addition to the monitor 147 and camera 175, the client device 100A, comprising a computer, may include other peripheral output devices (not shown), such as a printer.

The computer may also include a microphone 111 that is coupled to the system bus 123 via an audio processor 113 is understood by one of ordinary skill in the art. A microphone 111 may be used in combination with the voice recognition module 206 in order to process audible commands received from an operator.

The computer forming the central controller 106A may operate in a networked environment using logical connections to one or more remote computers, such as a web server. A remote computer 106B may be another personal computer, a server, a mobile phone, a router, a networked PC, a peer device, or other common network node. While the web server or a remote computer 106B may include many or all of the elements described above relative to the controller 106A, only a memory storage device 127B has been illustrated in this FIG. 2G. The logical connections depicted in FIG. 2G include a local area network (LAN) 142 and a wide area network (WAN) 142B. Such networking environments are commonplace in offices, enterprise-wide computer networks, intranets, and the Internet.

When used in a LAN networking environment, the computer forming the controller 106A is often connected to the local area network 142A through a network interface or adapter 153. When used in a WAN networking environment, the computer 106A may include a modem 154 or other means for establishing communications over WAN 142B, such as the Internet. Modem 154, which may be internal or external, is connected to system bus 123 via serial port interface 146. In a networked environment, program modules depicted relative to the server 102B, or portions thereof, may be stored in the remote memory storage device 127A. It will be appreciated that the network connections shown are just examples and other means of establishing a communications link between the computers may be used.

Moreover, those skilled in the art will appreciate that the system 102 may be implemented in other computer system configurations, including hand-held devices, multiprocessor systems, microprocessor based or programmable consumer electronics, network personal computers, minicomputers, mainframe computers, and the like. The system 102 may also be practiced in distributed computing environments, where tasks are performed by remote processing devices that are linked through a communications network. In a distributed computing environment, program modules may be located in both local and remote memory storage devices.

FIG. 3 is a flowchart illustrating a method 500 for producing look-ahead profile measurements in a drilling operation. Block 505 is the first block of method 500. In block 505, an energy transmitter such as the transmitter 420 described above in connection with the LWD tool 120 of FIG. 2H may be positioned proximate to a drilling tool, such as a drill bit 105.

Next, in block 510 one or more energy receivers such as one of the three receiver antennas 425A-C described above in connection with the LWD tool 120 of FIG. 2H. Next, in block 515 a drilling operation may commence.

In block 520, the look-ahead scan modules 101 may control the energy transmitter, such as transmitting antennas T1-T6, such that one or more of the transmitters emit look-ahead scans ahead of the drill bit 105. Next, in block 525, the transmitted energy is received with the one or more energy receivers that comprise the receiver antennas with reference numerals 425 along the LWD tool 120 as shown in FIG. 2H. The look-ahead scan modules 101 also can control the receiver antennas 425.

Next, in routine or submethod block 530, the look-ahead scan modules 101 generate look-ahead modeling graph data with the x-axis being a function of the drilling tool position. Further details of routine or submethod block 530 will be described below in connection with FIG. 4. In this routine block 530, the look-ahead scan modules 101 process the data that is used to produce the user interfaces 200A and 200B as illustrated in FIGS. 2A and 2C.

Next, in block 535, the look-ahead scan modules 101 also generate tracking data for producing the anisotropy ratio graph 200A of FIG. 2A. In block 540, the look-ahead scan modules 101 produce the look-ahead modeling graph 200B and display it on a display device 147 such as illustrated in FIG. 2B. In block 545, the look-ahead scan modules 101 produce the anisotropy graph 200A and display it on the display device 147 as illustrated in FIG. 2B.

Next in block 550, the look-ahead scan modules 101 may produce the formation dip graph 215 and displayed on the display device 147 as illustrated in FIG. 2B. In block 555, the look-ahead scan modules 101 may produce the mismatch data graph 220 and displayed on the display device 147 as illustrated in FIG. 2A.

One of ordinary skill in the art will appreciate that while blocks 530 through 555 have been illustrated and described as occurring in sequence/a particular order, these blocks 530 through 555 can be performed in any order and indeed can be performed in parallel relative to each other. That is, the multiple look-ahead parameters described above are being calculated simultaneously from inversions. This includes the data for the anisotropy ratio graph 205 and look-ahead modeling graph 210, formation dip graph 215, and mismatch data graph 220 of FIG. 2A. These four graphs 205, 210, 215, and 220 are can be rendered in any order or at substantially the same time from the inversion calculations as understood by one of ordinary skill in the art.

In block 560, the look-ahead scan modules 101 may generate the alerts, such as audible and/or visual alerts 110 that may be displayed on display device 147 and generated with speakers 159. The alerts 110 may correspond to the formations tracked with the look-ahead modeling graph 210A and 210C as illustrated in FIGS. 2A and 2B. The method 500 then returns to block 520 in which the look-ahead scans are repeated as desired by an operator of the system 102.

FIG. 4 is a flowchart illustrating a sub-method or routine 530 of FIG. 3 for generating look-ahead modeling graph data with the x-axis being a function of a position of a drilling tool in a drilling operation. Block 605 is the first block of sub-method 530. In block 605, the look-ahead scan modules 101 may track a station number or true measured depth for a look-ahead model with an x-axis or a horizontal axis of a user interface such as the x-axis of the look-ahead graph 210A in the user interface 200A of FIG. 2A and the look-ahead graph 210B found in the user interface 200B of FIG. 2C.

Next, in block 610, with a y-axis or vertical axis, the look-ahead scan modules 101 may track estimated formation values below an actual tool position based on one or more subsurface modeling techniques. Specifically, this block 610 corresponds with data 270 corresponding to the y-axis and below the tool position history line 250B of the look-ahead modeling graph 210A of FIG. 2A and the look-ahead modeling graph 210B of FIG. 2C. In these embodiments, the estimated formation values are based on inversions and specifically, Monte Carlo inversions as understood by one of ordinary skill in the art.

Next in block 615, with the y-axis or vertical axis of graph 210A or graph 210B, the look-ahead scan modules 101 may track actual measured resistivity values above the tool position. This block 615 generally corresponds to the measured resistivity value data 265 that is present above the tool position history line 250B as illustrated in FIGS. 2A and 2C.

In block 620, each value along the y-axis direction in the look-ahead modeling graph 210 may be displayed using a color coding scheme for facilitating rapid detection of formations/regions of interest. For example, a color coding scheme such as illustrated in FIG. 2B may be employed for the look-ahead modeling graph 210B.

Next, in optional block 625, an image of a drilling tool such as the LWD tool 120 may be displayed with a relative length corresponding to the values of the y-axis or vertical axis. Optional block 625 has been illustrated with dashed lines to indicate that this block may or may not be followed as desired by an operator of the system 102.

In optional block 630, graph 400A may be produced by the look-ahead scan modules 101 such as illustrated in FIG. 2C which plots a distribution of all estimated formations by the look-ahead measurements. Block 630 is optional and may be selected by an operator with the user interfaces 200A and 200B illustrated in FIGS. 2A and 2C. As noted previously, distribution graph 400A may be selected when an operator wants more information about a particular data point tracked by the position history line 250B. Specifically, an operator may select the distribution graph button 267A in the user interface 200A in order to generate the distribution graph 400A as illustrated in FIG. 2C.

In optional block 635, the look-ahead scan modules 101 may display the estimated formation graph 400A adjacent to the look-ahead graph 210C such that the estimated formation graph 400A corresponds to a single pool position, such as the borehole assembly 100 and specifically the drill tip 105, in time being tracked by the look-ahead graph 210C. As described above, the optional blocks have been illustrated with dashed lines to indicate that an operator may or may not select these optional features of the system 102. The sub-method or routine 530 returns back to block 535 of FIG. 3.

With this system 102, a new generation of a deep resistivity tool 111 located very close to the drilling bit 105 is provided which provides sensitivity of formations with resistivity contrast ahead of the bit 105. With this system 102, it is now possible in real-time to track the proximity of a reservoir top with depth of investigation up to about 100 ft and stop the borehole assembly (geo-stopping) before entering a potentially problematic formation region. Similar geo-stopping is also possible for navigation inside or outside salt dome.

This system 102 provides a method of tracking an incoming formation resistivity feature and its related display. With this tracking feature, assessment based on the historical display of the feature ahead of the bit 105 allows greater confidence in decision making during a drilling operation.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). A portable computing device may include a cellular telephone, a pager, a PDA, a smartphone, a navigation device, or a hand-held computer with a wireless connection or link.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). A portable computing device may include a cellular telephone, a pager, a PDA, a smartphone, a navigation device, or a hand-held computer with a wireless connection or link.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the sample methods described herein.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks may reproduce data magnetically, while discs reproduce data optically with lasers. Combinations of the above should also be included within the scope of computer-readable media.

Although only a few embodiments have been described in detail above, those skilled in the art will readily appreciate that many modifications are possible in the embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, sixth paragraph for any limitations of any of the claims herein, except for those in which the claim expressly uses the words 'means for' together with an associated function.

What is claimed is:

1. A method for producing look-ahead profile measurements comprising:
    positioning an energy transmitter proximate to a borehole assembly tool;
    positioning one or more energy receivers along a length of the borehole assembly;
    transmitting energy to produce look-ahead scans relative to the borehole assembly tool;
    generating look-ahead graph data with an x-axis being a function of a time relative to the position of the borehole assembly tool;
    producing a look-ahead graph; and
    displaying the look-ahead graph on a display device.

2. The method of claim 1, further comprising tracking estimated formation values based on earth models with the look-ahead scans.

3. The method of claim 2, further comprising displaying the estimated formation values on a display device with the estimated values being positioned below a tool position history line that is part of the look-ahead graph.

4. The method of claim 3, wherein the estimated formation values are based on inversions of resistivity data.

5. The method of claim 4, wherein the inversions comprise Monte-Carlo inversions.

6. The method of claim 1, further comprising tracking measured resistivity values and displaying these measured resistivity values above a tool history position line in the look-ahead graph.

7. The method of claim 3, further comprising displaying a distribution graph comprising estimated formations generated by the look-ahead scans, such that the distribution graph corresponds to a single tool position as tracked by the tool history position line.

8. The method of claim 1, further comprising commencing a drilling operation.

9. The method of claim 8, further comprising generating one or more alerts based on the look-ahead graph data.

10. A system for determining a geometry of a borehole comprising:
  means for positioning an energy transmitter proximate to a borehole assembly tool;
  means for positioning one or more energy receivers along a length of the borehole assembly;
  means for transmitting energy to produce look-ahead scans relative to the borehole assembly tool;
  means for generating look-ahead graph data with an x-axis being a function of a time relative to the position of the borehole assembly tool;
  means for producing a look-ahead graph; and
  means for displaying the look-ahead graph on a display device.

11. The system of claim 10, further comprising means for tracking estimated formation values based on earth models with the look-ahead scans.

12. The system of claim 11, further comprising means for displaying the estimated formation values on a display device with the estimated values being positioned below a tool position history line that is part of the look-ahead graph.

13. The system of claim 12, wherein the estimated formation values are based on inversions of resistivity data.

14. The system of claim 13, wherein the inversions comprise Monte-Carlo inversions.

15. The system of claim 14, further comprising means for tracking measured resistivity values and displaying these measured resistivity values above a tool history position line in the look-ahead graph.

16. A system for monitoring and controlling a drilling operation comprising:
  a drilling system, the drilling system comprising a logging and control module for tracking measured data;
  an energy transmitter coupled to a borehole assembly tool and an energy receiver coupled to the energy transmitter; and
  a controller coupled to the drilling system, the energy transmitter, and the energy receiver; the controller comprising a look-ahead scan module that controls the energy transmitter and the energy receiver; the look-ahead scan module controlling the production of look-ahead scans relative to the borehole assembly tool; the look-ahead scan module generating look-ahead graph data with an x-axis being a function of a time relative to the position of the borehole assembly tool; the look-ahead scan module producing a look-ahead graph displaying the look-ahead graph on a display device.

17. The system of claim 16, wherein the energy transmitter and energy receiver are part of a log while drilling (LWD) module.

18. The system of claim 16, wherein the look-ahead scan module tracks estimated formation values based on earth models with the look-ahead scans.

19. The system of claim 18, wherein the look-ahead scan module displays the estimated formation values on a display device with the estimated values being positioned below a tool position history line that is part of the look-ahead graph.

20. The system of claim 19, wherein the estimated formation values are based on inversions of resistivity data.

* * * * *